Jan. 6, 1925.  1,521,860
G. B. BRENDEL
HAND BINDER
Filed June 2, 1922
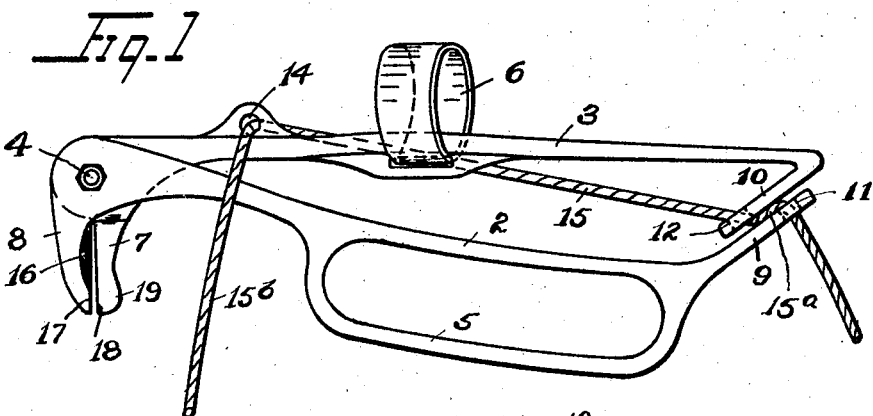
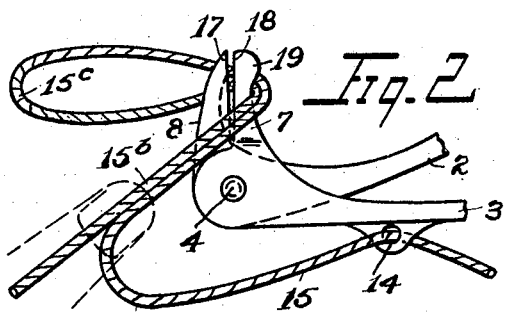
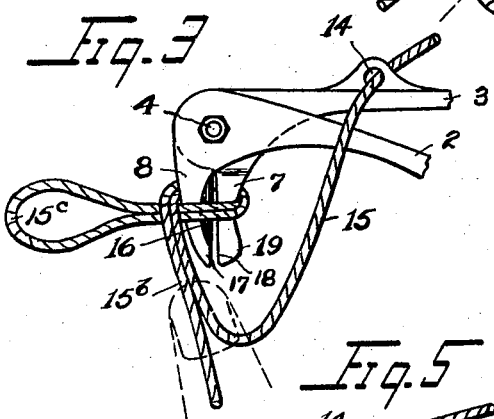
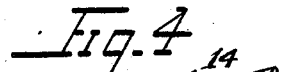
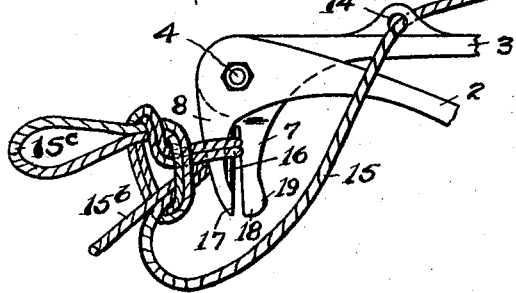
George B. Brendel, Inventor
By W.G. & D. M. Stewart
Attorneys Patented Jan. 6, 1925.

1,521,860

UNITED STATES PATENT OFFICE.

GEORGE B. BRENDEL, OF SINKING SPRING, PENNSYLVANIA.

HAND BINDER.

Application filed June 2, 1922. Serial No. 565,411.

*To all whom it may concern:*

Be it known that I, GEORGE B. BRENDEL, a citizen of the United States, residing at Sinking Spring, in the county of Berks and State of Pennsylvania, have invented certain new and useful Improvements in Hand Binders, of which the following is a specification.

My invention relates to knot-tying devices particularly adapted for hand binding of sheaves of grain or the like, and consists of an improved hand operated tool having a grip-controlled tension feed for the binder twine or cord and cooperating clamping and cutting jaws for forming a well known knot and severing the twine, as fully described in connection with the accompanying drawings, and the novel features of which are pointed out in the subjoined claims.

Fig. 1 is a side elevation of a knot-tying device embodying my invention.

Figs. 2, 3, 4 and 5 are fragmentary views of the clamping jaw portions of my device, and respectively indicate successive steps in the knot-tying and twine-severing operations.

As shown in the drawings my device comprises two members 2 and 3 pivoted together at 4 and provided respectively with a finger guard loop 5 and a thumb-engaging strap or band 6 forming hand grip portions for convenient manipulation of the pivoted members. The ends beyond the pivot 4 are bent or hooked, as shown, to form cooperating jaws 7 and 8, and the opposite ends, beyond the hand grip portions, are preferably provided with angularly inclined parallel twine-tensioning extensions 9 and 10 having twine-guide apertures 11 and 12 near their respective extremities; and an additional twine-guide eye 14 is provided, as shown, on member 3 adjacent the pivot 4 to lead the twine between the hand gripped portions without interfering with the fingers of the operator.

The cooperating jaws 7 and 8 are adapted to form a well known knot and sever the twine as hereinafter described, and their opposing jaw edges are provided, as shown, with a knife edge portion 16 adjacent the pivot 4, and with non-cutting clamping end portions 17 and 18; and jaw 7 is formed with a rearwardly bulged portion 19, as shown, to retain the twine bent around said jaws during the formation of the knot.

The supply ball for the twine or cord 15 may be carried by the operator in any suitable manner, as for instance, a bag or box slung from the shoulder or hung from the belt, and the free end of said twine is threaded through the guide apertures 11 and 12 and guide eye 14, as shown in Fig. 1. The apertures 11 and 12 in the ends of parallel extensions 9 and 10, are spaced apart, as shown, when the latter are closed together, leaving a portion of twine 15ᵃ extending between said apertures engaged by said extensions, and varying tensioning pressures and clamping action may be exerted on said portion by said extensions as regulated by the grip of the operator upon the hand grip portions of members 2 and 3.

In binding a sheaf of grain or similar article, or tying up a bundle, a sufficient amount of twine is drawn through the guide eyes to encircle the article, the grip of the hand controlling the feed tension by the closing together pressure exerted upon the extensions 9 and 10, and the hand pressure being increased to clamp the twine against further feeding when the proper amount is drawn. With the one hand of the operator thus engaged by my device, the twine is tightly drawn around the article to be bound, and its free end 15ᵇ brought into contact with the main portion of the twine beyond the guide eye 14, against which portion it is firmly held by the fingers of the other hand of the operator, thus forming a bundle-encircling loop 15ᶜ. In the drawings only a small loop 15ᶜ is shown, but it will be understood the size of this loop will be determined by the diameter of the article to be bound. With the ends of the loop 15ᶜ firmly held in the fingers of one hand, the hand gripped device is moved, with its jaws 7 and 8 turned in an upward direction, into contact with the loop portion between the article encircled and the finger gripped ends, which latter are then bent around the jaws as clearly seen in Fig. 2. The next step in the knot forming operation, as seen in Fig. 3, consists of a longitudinal turning movement of the hand gripped device, away from the operator, until the jaws 7 and 8 are in a downwardly directed position, the bulged portion 19 of jaw 7 preventing the twine from accidentally slipping from the jaws during this movement. The ends of the loop 15ᶜ have up to this time been firmly held by the operator in the fingers of one hand, but said ends are next inserted between the non-cutting clamping ends 17 and 18 of the jaws, which have been opened for this purpose, as seen in Fig. 4, and when the jaws are closed upon the ends to firmly clamp them, the finger hold may be released. The completion of this simple knot, as readily seen, is accomplished by pulling the jaws out of the twine bent around them, while maintaining the grip on the loop ends to draw the latter through this bend; the tapering curve of jaw end 17 permitting said bend freely slipping over the bulged end 19 of jaw 7 during this movement. The simple knot thus produced, loosened to show its formation, is shown in Fig. 5, which also indicates the final operation of severing the twine. This severing operation is simply accomplished, as shown, by sliding the loop ends from the non-cutting clamping grip portions 17 and 18 of the jaws toward the knife end portion 16 thereof and closing said jaws in a cutting movement by the hand manipulation of the members 2 and 3. The severed end of the twine may then be drawn from the knot for the next tying operation and the article is left securely bound with no waste of the binding twine.

The particular form of knot produced and above fully described, is not new, but my improved device provides for its ready formation, constant tensioned or clamping control of the binder twine, and severing of the latter, governed by the grip of one hand of the operator manipulating the members 2 and 3. My improved device is free of complicated parts, substantial in construction, and its simple operation will be readily understood and its expert manipulation quickly learned.

What I claim is:

1. In a knot-tying device, a pair of pivoted members having hand-grip portions and cooperating jaws extending at right-angles beyond the pivot point; said jaws having separate portions of their opposed inner edges adapted respectively for clamping and cutting the twine, and their outer edges being formed respectively with a tapering curved end and a rearwardly bulged loop-retaining end, and said hand-grip portions being provided with twine clamping and tensioning means.

2. In a knot-tying device, a pair of pivoted members having cooperating clamping-and-cutting jaw portions, and hand-grip portions having twine-clamping and tensioning extensions arranged to close together in parallel relation and provided with non-registering twine-passage apertures.

3. In a knot-tying device, a pair of pivoted members having cooperating clamping and cutting jaw portions, and hand-grip portions having angularly inclined parallel twine-clamping and tensioning extensions with inclined guide apertures therein, and a guide-aperture adjacent the pivoted jaws.

In testimony whereof I affix my signature.

GEORGE B. BRENDEL.